United States Patent [19]

Schnedecker et al.

[11] Patent Number: 4,518,635

[45] Date of Patent: May 21, 1985

[54] PROCESS FOR SEALING AT LEAST ONE END OF A CELLULAR MODULE

[75] Inventors: Guy Schnedecker, Paris; Jacques Mougin, Wissous, both of France

[73] Assignee: Commissariat a l'Energie Atomique, Paris, France

[21] Appl. No.: 505,427

[22] Filed: Jun. 17, 1983

[30] Foreign Application Priority Data

Jun. 25, 1982 [FR] France ................ 82 11221

[51] Int. Cl.³ .............................................. B05D 7/22
[52] U.S. Cl. .................................. 427/232; 427/233; 427/235; 427/236; 427/243; 427/348
[58] Field of Search ............... 428/117; 427/243, 247, 427/232, 233, 235, 236, 348, 264, 269

[56] References Cited

U.S. PATENT DOCUMENTS 4,041,591 8/1977 Noll et al. .................. 29/157.3 R
4,340,403 7/1982 Higuchi et al. ................ 428/117 X

FOREIGN PATENT DOCUMENTS 0025735 3/1981 European Pat. Off. .
0042302 12/1981 European Pat. Off. .

Primary Examiner—Evan K. Lawrence

[57] ABSTRACT

A process for the selective sealing of at least one end of a cellular module, the latter having rows of parallel channels for carrying at least two different fluids. The process consists of depositing a tight material on the end of the module to be sealed. Deposition is preceded by a preblocking operation using a material in the channels to be sealed which does not contribute to the actual sealing, but which serves as a mechanical support during the deposition of the sealing material, whereby only those channels having the preblocking material are sealed.

12 Claims, 7 Drawing Figures

PROCESS FOR SEALING AT LEAST ONE END OF A CELLULAR MODULE

BACKGROUND OF THE INVENTION

The present invention relates to a process for sealing at least one end of a cellular or alveolar module.

There are numerous industrial applications for cellular modules having a row of channels, in which circulate at least two different fluids. Such means are particularly encountered in heat exchangers or ultrafiltration installations. In view of the fact that these modules make it possible to carry different fluids, it is necessary to selectively seal their ends in order to permit the separation of the fluids. Various sealing processes have hitherto been proposed, but these solutions are often complicated and costly.

One solution was proposed in European Pat. No. 0 256 735 corresponding to French Pat. No. 79 21542 of Aug. 28, 1979 and which was filed by the present Applicant. FIG. 1 of the present application illustrates this process and in it is also possible to see a cellular module 1 having on the one hand rows 2 of individual channels 4 in which circulates a first fluid, and on the other hand rows 6 of channels 8 in which circulates a second fluid. According to this process, slots 10 are machined into the ends of rows 6 and then a tight sealing material 12 is deposited over the entire end surface to be sealed of module 1. The sealing material only partly penetrates the interior of the channels and essentially remains on the surface, so that there is a complete sealing of channels 4 belonging to rows 2, whilst the fluid circulating in channels 8 of rows 6 can pass out laterally through slots 10.

SUMMARY OF THE INVENTION

The present invention relates to a process for sealing one end of a cellular module, which eliminates any machining operation beforehand and which therefore clearly differs from the aforementioned patent.

In addition, the admission of fluids into the channels, whose ends remain free, takes place frontally and not laterally, because the latter leads to significant pressure losses. The present invention makes it possible to obtain any random sealing geometry.

The main feature of the process according to the invention is that the deposition of sealing material is preceded by a prefilling or preblocking operation consisting of blocking the channels which have to be sealed with the aid of a preblocking material intended solely to serve as a mechanical support for the sealing material during the deposition of the latter enabling sealing of a channel, whereby only those channels having the preblocking material are sealed. It is with respect to the preblocking, that the desired geometrical configuration is chosen.

According to a first embodiment, the preblocking material is in the form of a dry powder and the preblocking operation comprises the following stages:

using the preblocking material, all the channels issuing onto the end of the module to be sealed are blocked, a grid is applied to one of the ends of the module, the geometry of said grid being such that it has openings corresponding to the channels to be left open, and a compressed gas is blown into the channels of the module, in order to remove the preblocking material in the channels which have to be left open.

According to another embodiment of this process, the preblocking material is in the form of a viscous paste and is deposited by screen process printing or some similar method.

In certain cases, it may be useful to follow the preblocking operation by a thermal consolidation or strengthening process by the preblocking material.

Prior to the deposition of the sealing material, it may also prove necessary to machine, level or smooth the preblocked face of the module in order to improve the frontal surface state of the blocked channels.

The tight sealing material is generally deposited by high temperature spraying, the module effecting a rotary movement about an axis parallel to the direction defined by the channels.

With respect to the direction defined by the channels, the angle at which the tight sealing material is sprayed is approximately 40° to 50° and is preferably close to 45°. Spraying can take place in an alternating manner, a disk performing a rotary movement and having at least one slot, being placed in front of the end of the cellular module to be sealed.

The preblocking material can remain, or can be removed after depositing the sealing material.

Finally, the invention also relates to a cellular module, whereof at least one of the ends has been selectively sealed by the aforementioned process.

BRIEF DESCRIPTION OF THE DRAWINGS

The invention is described in greater detail hereinafter relative to non-limitative embodiments and the attached drawings showing:

FIG. 4b, a perspective view of the sealed end of the module of FIG. 4a.

DETAILED DESCRIPTION OF THE INVENTION

Figure 1:
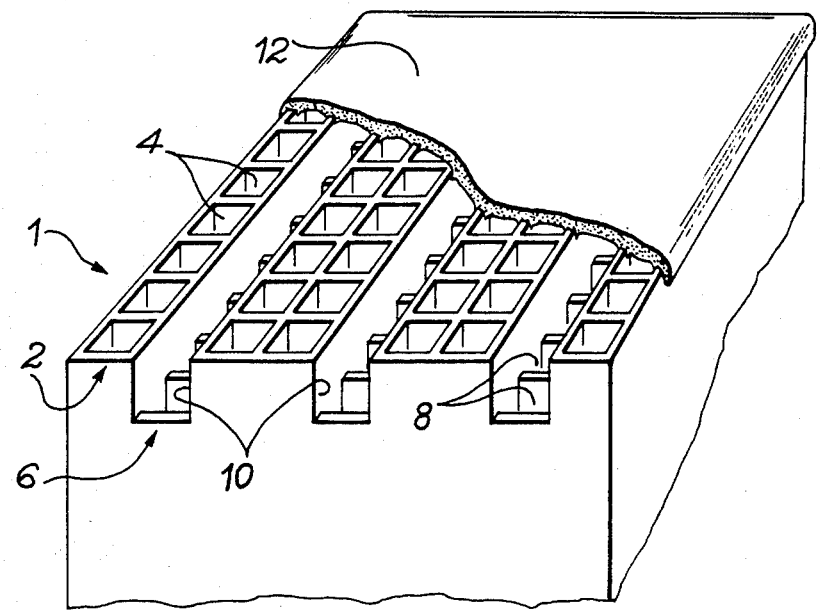
FIG. 1, already described, a partly broken away perspective view of one end of a cellular module sealed according to a prior art process.
Figure 2:
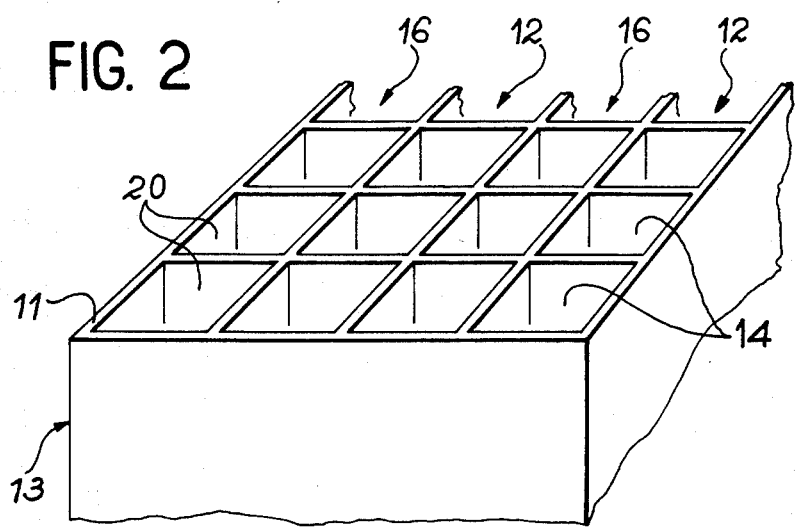
FIG. 2, a perspective view of one end of a cellular module to be sealed.

FIG. 2 shows the end 11 of module 13 which has to be sealed. There are rows 12 of channels 14 to be sealed and rows 16 of channels 20 to be left open. The channels can have square or rectangular sections and their sides have lengths of approximately 1 mm, whilst the thickness of the partition separating the channels is approximately 100 to 250 microns.

In a first embodiment, the preblocking material is in the form of a pulverulent mixture containing, by weight, 75% of aluminium powder having an average grain size of 45 microns and 25% of powder of PFA (perfluoroalkoxyl), the latter preferably having a grain size below 100 microns. This mixture is prepared dry in the mortar and is then introduced by packing or stuffing into the ends of all the channels issuing onto the face of the module to be sealed.

Figure 3:
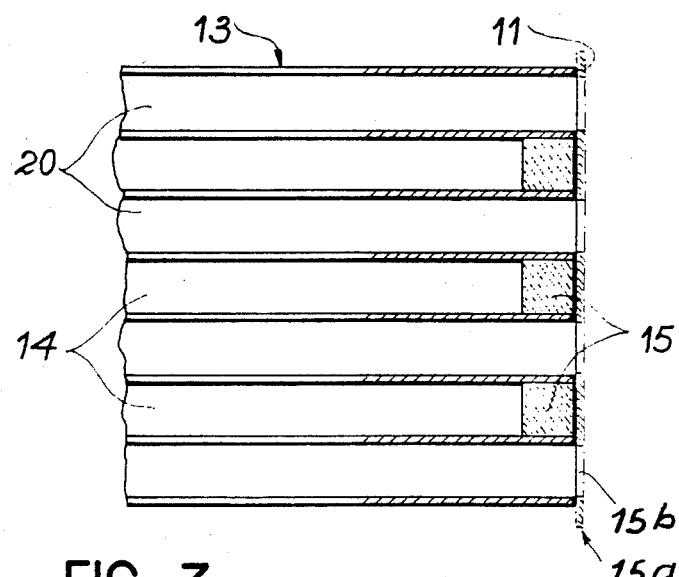
FIG. 3, a diagrammatic sectional view illustrating one end of the preblocked module.

The following stage consists of removing the powder from the channels, whose ends are to be left open. For this purpose, a grid having a suitable geometrical configuration is applied to the end of the module opposite to the end 11 to be sealed. The geometry of the grid is such that it blocks the inlet of the channels 14 which are to be sealed and leaves open the inlet of the channels 20 to be open. The grid may also be applied to end 11 of module 13. FIG. 3 shows a grid 15a having openings 15b corresponding to the channels 20 to be left open. A gaseous stream, e.g. of nitrogen compressed under a pressure of a few bars, is passed through the module from the end to which the grid is applied. This has the effect of eliminating the preblocking material present at the end of the channels which are to be left open.

As the preblocking material is to serve as a mechanical support for the sealing material during the subsequent deposition of the latter, it is necessary to consolidate or strengthen it by a suitable heat treatment. In the case of the PFA and aluminium powder mixture, the PFA serves as a binder and has a melting point of approximately 310° C. For this reason, the heat treatment is carried out at a temperature just above this value, e.g. at 320° C. A first method consists of introducing module 13 into an oven, which is progressively heated at a rate of 100° C./hour, followed by the observation, at the treatment temperature, a zone for a period between 15 and 30 minutes, followed by a slow return to ambient temperature. Another method consists of solely subjecting the end 11 of module 13 to a fast heat treatment by passing it for 5 minutes through an oven preset to 340° C. Such heat treatments have been chosen in order to permit an adequate mechanical strengthening, whilst limiting the contraction due to the plastic material (such a contraction could lead to local separations of the blocking material from the walls of the module, or even to cracking). This leads to the result illustrated in FIG. 3, where it is possible to see the preblocking material 15 plugging the ends of the channels, such as 14, whilst it has been removed from the ends of channels 20.

Figure 4A:
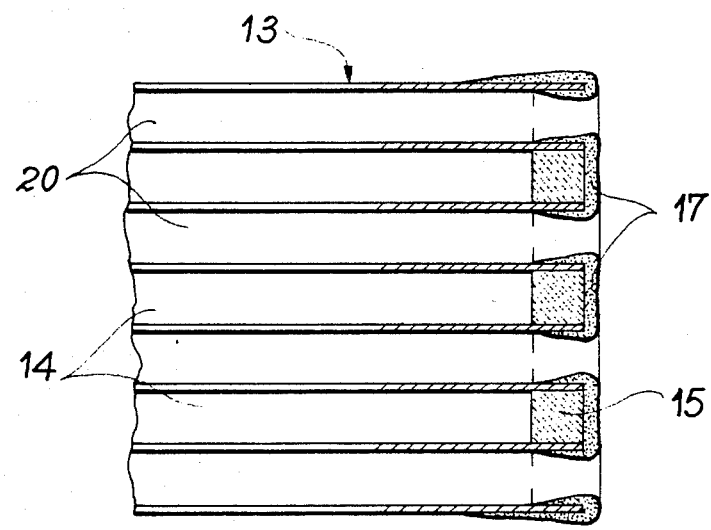
FIG. 4a, a view similar to FIG. 3 showing the end of the module after depositing the sealing material.
Figure 4B:
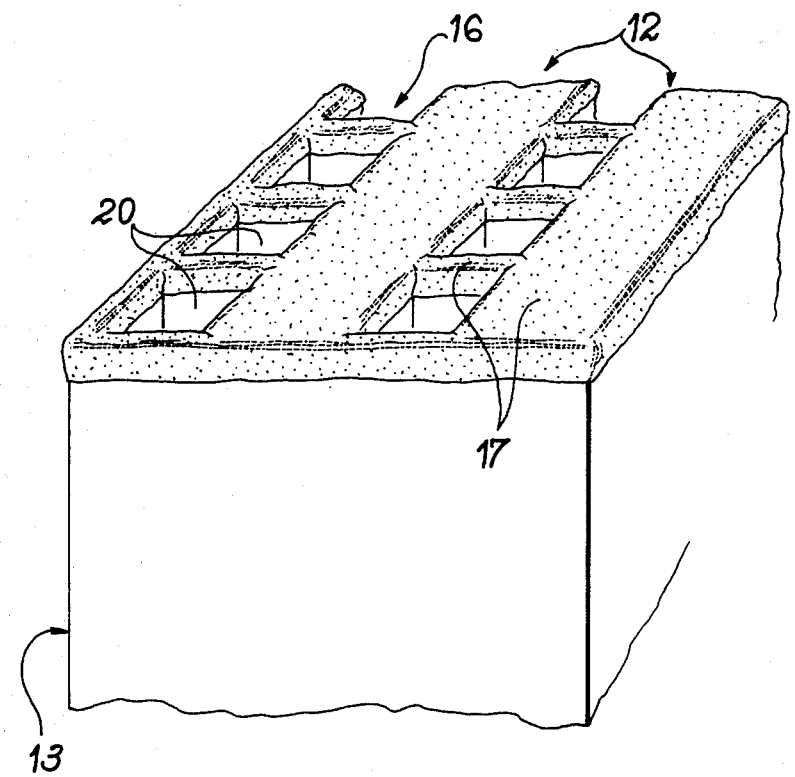

FIGS. 4a and 4b illustrate the deposition of the sealing material, once the preblocking has taken place. If necessary, the preblocked face of the module is levelled, smoothed or ground in order to eliminate the excessive thickness of the preblocking material, or simply in order to obtain a sufficiently flat surface. This is followed by the deposition of sealing material 17 in order to arrive at the result illustrated in FIGS. 4a and 4b. In the presently described embodiment, the sealing material is high purity aluminum, deposited by means of an oxyacetylene gun.

Figure 5:
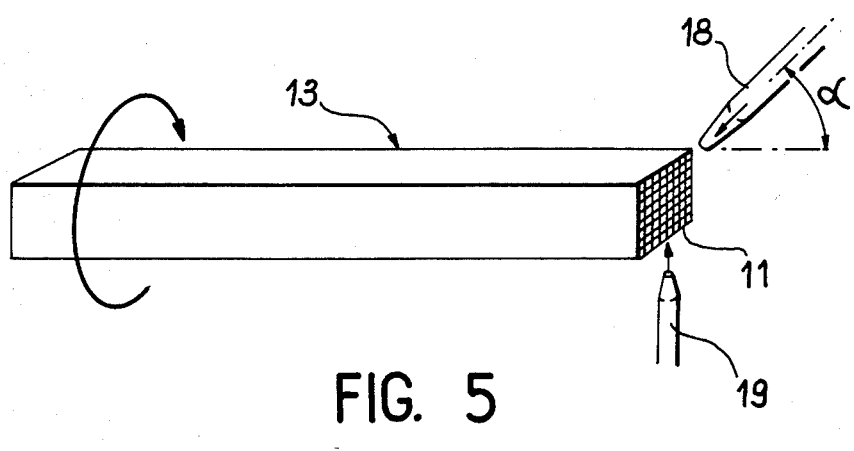
FIG. 5, a diagrammatic perspective view showing how the sealing material is deposited by spraying onto one end of the module.
Figure 6:
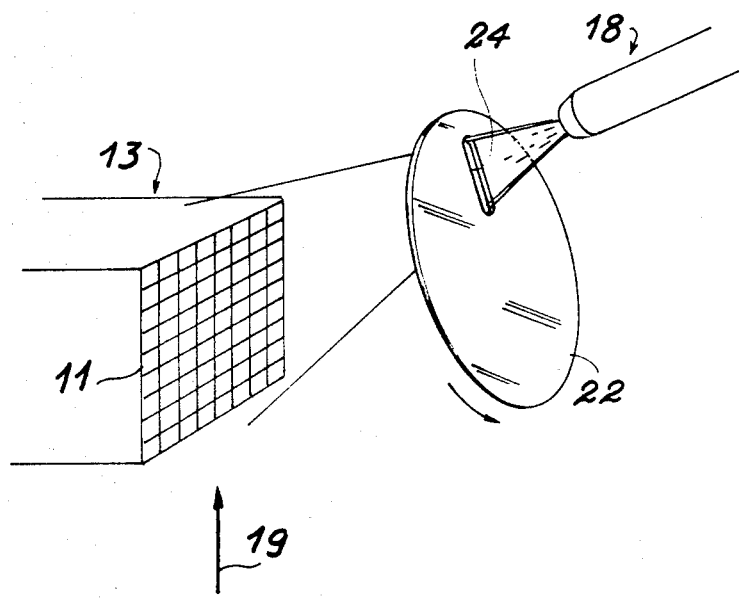
FIG. 6, a diagrammatic perspective view showing how a slotted disc can be placed in front of the end of the cellular module to be sealed.

The spraying method is illustrated in FIG. 5. It can be seen that the module 1 effects a rotary movement about an axis parallel to the direction defined by the channels, whilst the oxyacetylene gun 18, supplied with aluminium in wire form, is positioned in the vicinity of module end 11 and with the rotation axis therefore forms an angle α, whose value is between 40° and 50° and is preferably close to 45°. The distance between the end of the gun 18 and the face 11 of the module is approximately 15 cm. A nozzle 19 supplies compressed air to partly eliminate the calories supplied by the deposition process. The sealing material can be deposited continuously and, in this case, the deposition period lasts 90 seconds, in order that the partial sealing of the channels which are to be left open remains less than 50%. Thus, it can be seen from FIG. 4b, that during spraying part of the blocking material 17 has entered channels 20 and is deposited on the ends of the partitions separating these channels. However, despite this cross-sectional reduction, fluid contained in channels 20 can still flow out under satisfactory conditions. It is also possible to carry out a discontinuous spraying with the interpositioning, between end 11 of the module and gun 18, of a rotary disk having one or more slots. FIG. 6 is a perspective view showing a rotatable disc 22 disposed between gun 18 and the end 11 to be sealed of the module 13. The disc 22 has a slot 24 so that deposition takes place only when slot 24 passes in front of gun 18 and the deposited material is allowed to cool until slot 24 passes again in front of gun 18.

The deposition period is longer with the second method (3 to 6 minutes), but cases exist where the lack of toughness or stability of the module is incompatible with the continuous spraying method.

In a second embodiment, preblocking takes place with a soluble glass, in order to be able to eliminate the latter after depositing the sealing material. For example, it is possible to use sodium silicate placed in the channels to be sealed by screen process printing. The thus presealed elements are heated to 110° C. for 1 hour in an oven and then undergo slow cooling (air cooling). This leads to a glass, which perfectly adheres to the walls of the module. This is followed by aluminium coating as in the preceding embodiments, then the elements are rinsed with hot water, which has the effect of eliminating the glass, which is soluble in water.

In a third embodiment, preblocking takes place as in the preceding examples (mixture of aluminium powder and PFA, or the use of a soluble glass), but the deposited coating is of alumina. In this case, the spraying operation is longer in order to obtain a thickness comparable to that of an aluminium deposit and the temperature rise is greater. Consequently, use is made of the alternative spraying procedure, with the interpositioning of a slotted disk, which performs a rotary movement at a speed of 2 r.p.m. For a total spraying time of approximately 8 minutes, the sealing quality is comparable to that obtained with aluminium coatings.

In a fourth embodiment, preblocking takes place with e.g. alumina-filled glasses. In this case, the glass serves solely as a binder and the deposition in the channels takes place by screen process printing. This is followed by a strengthening heat treatment at a temperature between 600° and 1100° C., as a function of the glass used and its melting point. The sealing material is then deposited using aluminium or alumina, in the manner illustrated in the preceding embodiments.

What is claimed is:

1. A process for the selective sealing of at least one end of a cellular module having rows of parallel channels serving to carry at least two different fluids, at least a number of the channels being to be sealed while the other channels are to be left open, said process comprising the following steps:
   depositing a preblocking material on said end of said cellular module, clogging all the channels,
   removing the preblocking material from the channels which are to be left open, and
   depositing a sealing material on said end of said cellular module, the preblocking material serving as a mechanical support for the sealing material during deposition of the latter to enable sealing of a channel, whereby only those channels having the preblocking material are sealed.

2. A process according to claim 1, wherein the preblocking material is in the form of a dry powder.

3. A process according to claim 1, wherein the preblocking material is in the form of a viscous paste.

4. A process according to claim 3, wherein the preblocking material is applied to the end of the module to be sealed by screen process printing.

5. A process according to claim 1, wherein the preblocking operation is followed by a strengthening heat treatment of the preblocking material.

6. A process according to claim 1, wherein the preblocking operation is followed by the machining of the corresponding face of the cellular module.

7. A process according to claim 1, wherein the preblocking material is removed after the deposition of the tight sealing material.

8. A process according to claim 1, wherein the tight sealing material is deposited by high temperature spraying.

9. A process according to claim 8, wherein the cellular module performs a rotary movement about an axis parallel to the direction defined by the channels, during the spraying of the sealing material.

10. A process according to claim 9, wherein the angle at which the tight sealing material is sprayed with respect to the direction defined by the channels is approximately 40° to 50° and is preferably close to 45°.

11. A process according to claim 8, wherein the tight sealing material is sprayed in an alternating manner using a disk which performs a rotary movement and has at least one slot being placed in front of the end of the cellular module to be sealed.

12. A process for the selective sealing of at least one end of a cellular module having rows of parallel channels serving to carry at least two different fluids, at least a number of the channels being to be sealed while the other channels are to be left open, said process comprising the following steps:

depositing a preblocking material on said end of said cellular module, clogging all the channels, applying a grid to one of the ends of the module, said grid having openings corresponding to the channels which are to be left open, blowing a compressed gas into the channels of the module, to thereby remove the preblocking material from the channels which are to be left open, and depositing a sealing material on the end to be sealed of the module, the preblocking material serving as a mechanical support for the sealing material during deposition of the latter to enable sealing of a channel, whereby only those channels having the preblocking material are sealed.

* * * * *